US010528344B2

(12) United States Patent
Späth et al.

(10) Patent No.: US 10,528,344 B2
(45) Date of Patent: Jan. 7, 2020

(54) MODULAR POINTS-TO ANALYSIS

(71) Applicant: Oracle International Corporation, Redwood Shores, CA (US)

(72) Inventors: Johannes Späth, Mainz (DE); Francois Gauthier, Brisbane (AU); Padmanabhan Krishnan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 225 days.

(21) Appl. No.: 15/693,131

(22) Filed: Aug. 31, 2017

(65) Prior Publication Data

US 2019/0065180 A1   Feb. 28, 2019

(51) Int. Cl.
*G06F 8/75*   (2018.01)
*G06F 21/57*   (2013.01)

(52) U.S. Cl.
CPC ............ *G06F 8/75* (2013.01); *G06F 21/577* (2013.01); *G06F 2221/033* (2013.01)

(58) Field of Classification Search
CPC ... G06F 9/44; G06F 21/54; G06F 9/45; G06F 15/16; G06F 17/30; G06F 8/75; G06F 21/577
See application file for complete search history.

(56) References Cited

U.S. PATENT DOCUMENTS

| 8,782,117 | B2* | 7/2014 | Nachreiner | G06F 9/547 709/200 |
| 9,223,683 | B1* | 12/2015 | Knych | G06F 11/3692 |
| 9,329,845 | B2* | 5/2016 | Cui | G06F 8/434 |
| 9,471,776 | B2* | 10/2016 | Gu | G06F 21/54 |
| 2008/0243908 | A1* | 10/2008 | Aasman | G06F 16/28 |

OTHER PUBLICATIONS

Ali, K. et al., "Averroes: Whole-Program Analysis without the Whole Program" Proceedings of the 27th European Conference on Object-Oriented Programming, Montpellier, France, Jul. 1-5, 2013, vol. 7920 of Lecture Notes in Computer Science, pp. 378-400, Springer, 2013 (24 pages).

(Continued)

*Primary Examiner* — Thanhnga B Truong
(74) *Attorney, Agent, or Firm* — Ferguson Braswell Fraser Kubasta PC

(57) ABSTRACT

A method for analyzing code may include determining, using a dependency graph for the code, modules each including function definitions, and generating source points-to tuples and a call graph for a source function definition in a first module. The source points-to tuples may include a source tuple including a source variable and a source allocation site. The source allocation site may be a reference to a location in a memory of a computer system allocated when the source function definition is executed. The method may further include determining, using the call graph and until a fixedpoint condition is triggered, target function definitions reachable from the source function definition, determining that a target summary is stored for a first target function definition, and importing the target summary into a source summary for the source function definition. The source summary may include the source points-to tuples.

20 Claims, 8 Drawing Sheets

(56) References Cited

OTHER PUBLICATIONS

Feng, Y. et al., "Bottom-up Context-Sensitive Pointer Analysis for Java", Proceedings of the 13th Asian Symposium, APLAS 2015, Pohang, South Korea; Nov. 30-Dec. 2, 2015, vol. 9458 of Lecture Notes in Computer Science, pp. 465-484, Springer, 2015 (18 pages).
Rountev, A. et al., "Points-to and side-effect analyses for Programs Built with Precompiled Libraries", Proceedings of the 10th International Conference, CC 2001, held as Part of the Joint European Conferences on Theory and Practice Software, ETAPS 2001, Genova, Italy, Apr. 2-6, 2001, vol. 2027 of Lecture Notes in Computer Science, pp. 20-36, Springer, 2001 (17 pages).

* cited by examiner

| Selected Function Definition 422 | Variable 424 | Allocation Site 426 |
|---|---|---|
| main 402 | args | external |
| main 402 | a | Allocation Site A 412 |
| main 402 | b | Allocation Site B 414 |
| main 402 | c | Allocation Site B 414 |
| A.<init> 406 | this | Allocation Site A 412 |
| B.<init> 404 | this | Allocation Site B 414 |
| initField 408 | this | Allocation Site A 412 |
| initField 408 | x | Allocation Site B 414 |
| initField 408 | y | Allocation Site B 414 |

Summary for main 430

FIG. 4C

MODULAR POINTS-TO ANALYSIS

BACKGROUND

Points-to analysis is a fundamental approach to code analysis, and enables many techniques for identifying defects and security vulnerabilities. Points-to analysis is a method for statically identifying object references that are stored in variables at runtime. Algorithms to find defects, such as taint or typestate analysis, often use points-to analyses to reason about potential object flows along code execution paths. Even though points-to analysis has been studied extensively, a number of challenges remain. For example, most state-of-the-art points-to analyses require the entire code to be available at analysis time. This requirement is a major limitation in practice as it limits the size of the code that can be analyzed. Application code will typically only use part of a library or framework. Analyzing an application with an entire library or all possible frameworks is not scalable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for analyzing code including determining, using a dependency graph for the code, modules each including function definitions, and generating source points-to tuples and a call graph for a source function definition in a first module. The source points-to tuples include a source tuple including a source variable and a source allocation site. The source allocation site is a reference to a location in a memory of a computer system allocated when the source function definition is executed. The method further includes determining, using the call graph and until a fixedpoint condition is triggered, target function definitions reachable from the source function definition, determining that a target summary is stored for a first target function definition, and importing the target summary into a source summary for the source function definition. The source summary includes the source points-to tuples.

In general, in one aspect, one or more embodiments relate to a system for analyzing code including a processor, a dependency graph for the code including modules each including function definitions, and a memory including instructions that, when executed by the processor, cause the processor to determine modules using the dependency graph, and generating source points-to tuples and a call graph for a source function definition in a first module. The source points-to tuples include a source tuple including a source variable and a source allocation site. The source allocation site is a reference to a location in a memory of a computer system allocated when the source function definition is executed. The instructions further cause the processor to determine, using the call graph and until a fixedpoint condition is triggered, target function definitions reachable from the source function definition, determine that a target summary is stored for a first target function definition, and import the target summary into a source summary for the source function definition. The source summary includes the source points-to tuples. The system further includes a repository configured to store at least the code and the dependency graph.

In general, in one aspect, one or more embodiments of the invention relate to a non-transitory computer readable medium including instructions that, when executed by a processor, perform a method for analyzing code including determining, using a dependency graph for the code, modules each including function definitions, and generating source points-to tuples and a call graph for a source function definition in a first module. The source points-to tuples include a source tuple including a source variable and a source allocation site. The source allocation site is a reference to a location in a memory of a computer system allocated when the source function definition is executed. The method further includes determining, using the call graph and until a fixedpoint condition is triggered, target function definitions reachable from the source function definition, determining that a target summary is stored for a first target function definition, and importing the target summary into a source summary for the source function definition. The source summary includes the source points-to tuples.

Other aspects of the invention will be apparent from the following description and the appended claims.

BRIEF DESCRIPTION OF DRAWINGS

FIG. 4A, FIG. 4B, FIG. 4C, and FIG. 5 show examples in accordance with one or more embodiments of the invention.

DETAILED DESCRIPTION

Figure 1:
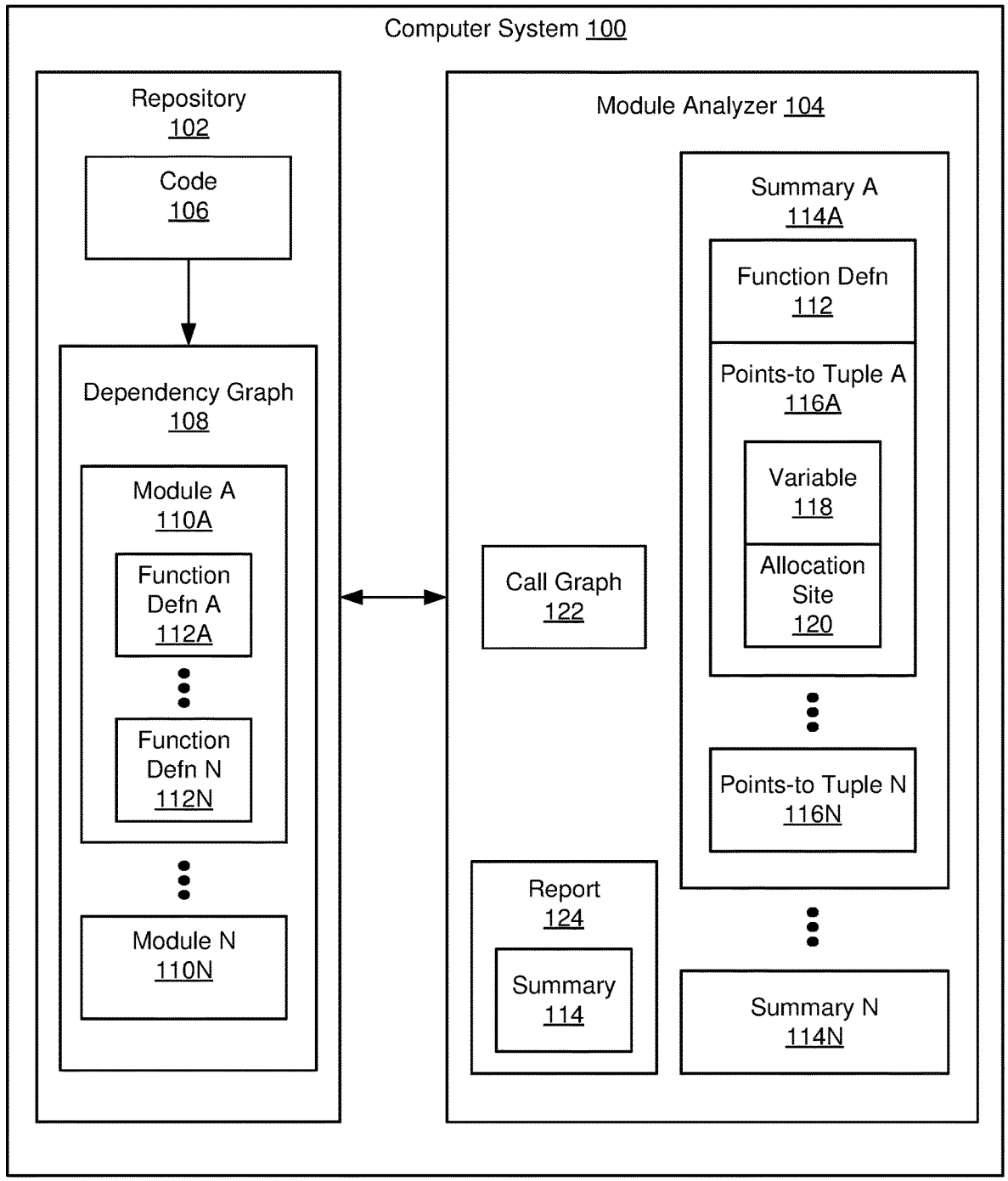
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention are directed to a system, method, and non-transitory computer readable medium for analyzing code. In one or more embodiments, a coarse (e.g., efficiently computable) dependency graph is used to group function definitions (e.g., procedures) into modules. For example, one module may correspond to application code, and a second module may correspond to code in a library or framework.

A points-to analysis may be performed starting with a source (e.g., entry) function definition for a module. In one or more embodiments, the points-to analysis yields a summary for the source function definition that includes points-to tuples, each including a variable and an allocation site that creates an object. The summary may be augmented by importing summaries for the transitive closure of target function definitions that are reachable from the source function definition. In one or more embodiments, only those target function definitions in the transitive closure need to be analyzed and summarized, rather than analyzing the entire module that includes the target function definitions. The set of target function definitions may be computed on demand as the points-to analysis incrementally identifies additional reachable target function definitions, until a fixedpoint is triggered when no additional target function definitions are identified.

Importing a target summary for a target function definition may include resolving unknown allocation sites in the target summary using the points-to analysis for the source function definition. The target summaries may be computed in advance and reused, thereby improving the efficiency, and therefore, scalability, of analyzing the source function definition. For example, when application code is modified, it may be unnecessary to recompute the points-to analysis for unchanged portions of a library used by the application code.

FIG. 1 shows a computer system (100) in accordance with one or more embodiments of the invention. As shown in FIG. 1, the computer system (100) includes a repository (102) and a module analyzer (104). In one or more embodiments, the computer system (100) takes the form of the computing system (600) described with respect to FIG. 6A and the accompanying description below, or takes the form of the client device (626) described with respect to FIG. 6B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (106) and a dependency graph (108). In one or more embodiments, the code (106) may be any collection of source code including various software components. That is, the code (106) may be any collection of computer instructions written in a human-readable programming language. The code (106) may be transformed by a compiler into binary machine code. Compiled machine code may then be executed by a processor (e.g., contained in computer system (100)) in order to execute the software components generated from the code (106).

In one or more embodiments, the code (106) may be represented in a procedural or imperative programming language (e.g., Java). In one or more embodiments, the code (106) may be represented in a declarative programming language. For example, declarative code may be expressed in Datalog as a set of relations (i.e., facts) and rules (i.e., clauses). A relation may express facts as one or more tuples.

Declarative code may express what should be accomplished without expressing a sequence of instructions (i.e., a control flow) to accomplish the goal. Said another way, declarative code (e.g., as opposed to procedural or imperative code) may be code in which the logic of a computation is expressed without describing its control flow. Declarative code may seek to minimize side effects by describing what should be accomplished rather than how to accomplish a goal.

In one or more embodiments, the dependency graph (108) includes modules (110A, 110N) of the code (106). The dependency graph (108) may be generated from the code (106) using a variety of techniques. In one or more embodiments, the dependency graph (108) may be a coarse graph that is efficiently computed. In one or more embodiments, the dependency graph (108) may be based on a class hierarchy of a programming language. Alternatively, the dependency graph (108) may be based on a points-to analysis of the code (106) (e.g., to obtain a precise dependency graph (108) that may be computationally expensive to generate).

In one or more embodiments, a module (110A, 110N) of the code (106) may include function definitions (112A, 112N). In one or more embodiments, a function definition (112A, 112N) is a subset of the computer instructions of the code (106). For example, a function definition (112A, 112N) may be a procedure or a method.

In one or more embodiments, a module (110A, 110N) includes mutually dependent information. In one or more embodiments, a module (110A, 110N) may correspond to a strongly connected component of the dependency graph (108). For example, the strongly connected component may include a collection of function definitions (112A, 112N) that call each other (e.g., where any function definition (112A, 112N) in the collection may be reachable, via a series of calls, from any other function definition (112A, 112N) in the collection). In one or more embodiments, a module (110A, 110N) may be a syntactic unit of the code (106), such as a class.

Continuing with FIG. 1, in one or more embodiments, the module analyzer (104) may be implemented in hardware (e.g., circuitry), software, firmware, and/or any combination thereof. In one or more embodiments, the module analyzer (104) includes summaries (114A, 114N), a call graph (122), and a report (124). In one or more embodiments, a summary (114A, 114N) includes points-to tuples (116A, 116N). In one or more embodiments, the points-to tuples (116A, 116N) of a summary (114A, 114N) may be generated by a points-to analysis for a portion of the code (106). The points-to analysis may be a context-insensitive analysis. In one or more embodiments, the points-to tuples (116A, 116N) generated for the summary (114A, 114N) correspond to a function definition (112A, 112N). In one or more embodiments, the points-to tuples (116A, 116N) generated for the summary (114A, 114N) correspond to a module (110A, 110N).

In one or more embodiments, the repository (102) includes summaries (114A, 114N) (not shown). That is, summaries (114A, 114N) may be stored in the repository (102) for use in a subsequent points-to analysis.

In one or more embodiments, each points-to tuple (116A, 116N) includes a variable (118) and an allocation site (120) for an object, such that the variable (118) may point to the allocation site (120) during the execution of the code (106). A variable (118) may be a symbol (e.g., 'x', 'y', 'input', 'result') that references a location in the code (106) where a value is stored, such as an allocation site (120). An allocation site (120) may be a statement in the code (106) that declares, instantiates, and/or initializes an object. For example, an allocation site (120) A::x=new T( ) assigns a new object instance of type T to the variable (118) x, where the allocation site (120) is labeled 'A'. In one or more embodiments, the allocation site (120) (e.g., for a base object) may be referred to by the label associated with a 'new' statement. A variable (118) may refer to a simple allocation site (120) (e.g., a numerical or string value), may refer to a complex allocation site (120) (e.g., a base object or structure containing one or more fields), or may refer to a field in a complex allocation site (120). The allocation site (120) may contain different values at different points in time. In one or more embodiments, the allocation site (120) may refer to a location in a memory (e.g., a heap memory) of the computer system (100) that is allocated when the function definition (112A, 112N) that includes the allocation site (120) is executed.

In one or more embodiments, the allocation site (120) may be a marker indicating that the allocation site is unknown. For example, the allocation site (120) may be external to the module (110A, 110N) that includes the function definition (112A, 112N) corresponding to the points-to tuple (116A, 116N) that includes the allocation site (120).

Continuing with FIG. 1, in one or more embodiments, the module analyzer (104) includes functionality to generate a call graph (122). The call graph (122) may include nodes corresponding to function definitions (112A, 112N), where the flow of control between function definitions (112A, 112N) is indicated via edges between nodes. For example, an edge (f, g) in the call graph (122) may indicate that function definition f (112A, 112N) calls function definition g (112A, 112N). The calling function definition f (112A, 112N) may be referred to as the source function definition (112A, 112N), and the called function definition g (112A, 112N) may be referred to as the target function definition (112A, 112N). For example, a source function definition (112A, 112N) may call multiple target function definitions (112A, 112N). In one or more embodiments, a source function definition (112A, 112N) may be an entry point to a module (110A, 110N). For example, the source function definition (112A, 112N) may implement an application program interface (API) to a module (110A, 110N).

In one or more embodiments, the module analyzer (104) may include functionality to generate a report (124) that includes a summary (114A, 114N). For example, the report (124) may include a summary (114A, 114N) for a function definition (112A, 112N). Alternatively, the report (124) may include a summary (114A, 114N) for a module (110A, 110N). In one or more embodiments, the report (124) may be stored as a document capable of being accessed by an interested entity.

While FIG. 1 shows a configuration of components, other configurations may be used without departing from the scope of the invention. For example, various components may be combined to create a single component. As another example, the functionality performed by a single component may be performed by two or more components.

Figure 2:
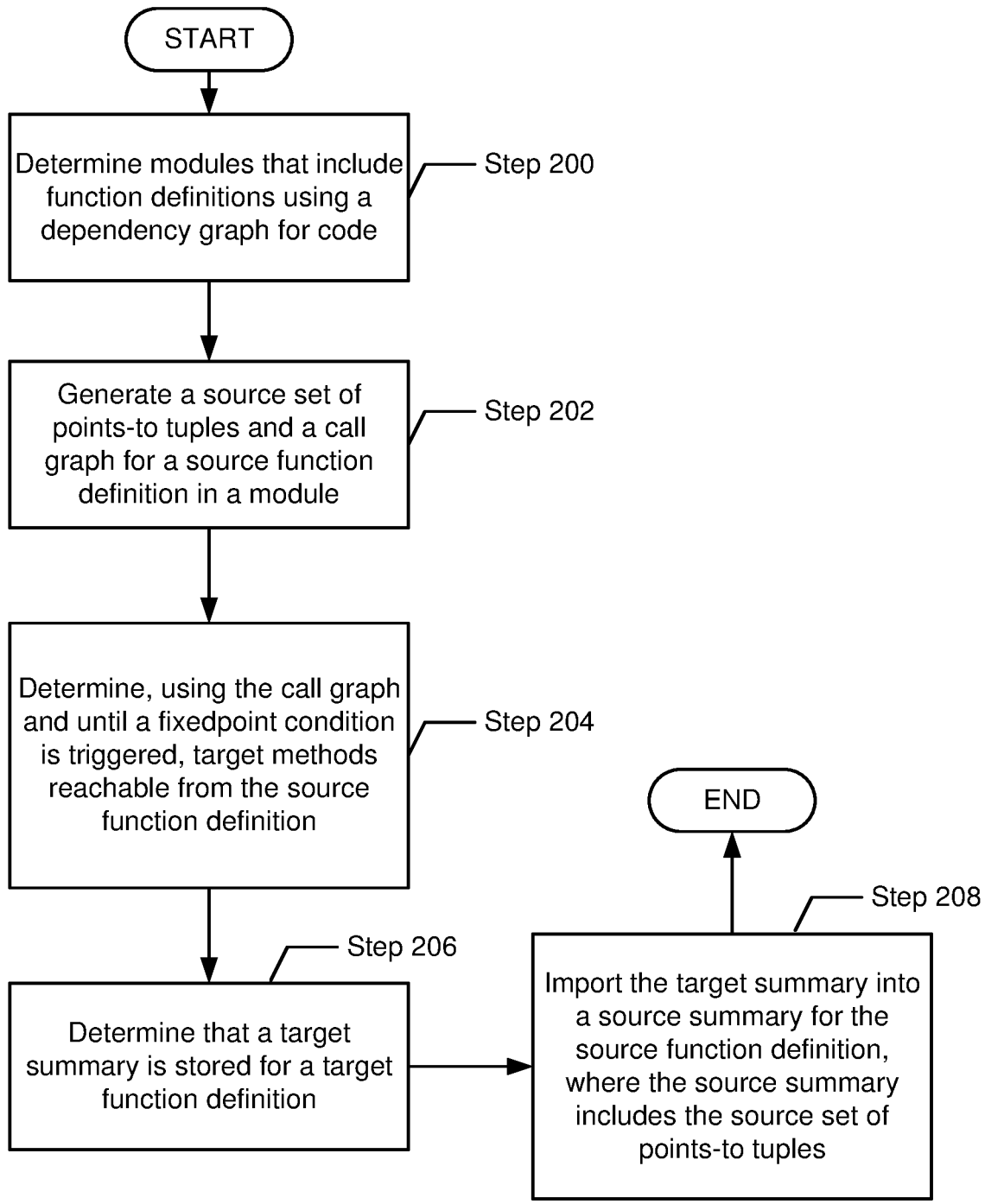
FIG. 2 and FIG. 3 show flowcharts in accordance with one or more embodiments of the invention.

FIG. 2 shows a flowchart in accordance with one or more embodiments of the invention. The flowchart depicts a process for analyzing code. One or more of the steps in FIG. 2 may be performed by the components (e.g., the module analyzer (104)) of the computer system (100), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a set of modules is determined using a dependency graph for the code. In one or more embodiments, the dependency graph may be a coarse graph that is efficiently computed (e.g., based on a class hierarchy of a programming language). Each module may include a set of function definitions. Each module may correspond to a strongly connected component of the dependency graph.

In Step 202, a source set of points-to tuples and a call graph are generated for a source function definition in a first module of the set of modules. In one or more embodiments, the source set of points-to tuples may be generated by a points-to analysis of the source function definition. In one or more embodiments, the points-to analysis is limited to function definitions in the first module (e.g., where the first module corresponds to a strongly connected component of the dependency graph). Each points-to tuple may include a variable and an allocation site for an object. In one or more embodiments, the allocation site may refer to a location in a memory (e.g., a heap memory) of the computer system that is allocated when the function definition that includes the allocation site is executed.

The call graph may include nodes corresponding to function definitions, where the flow of control between function definitions is indicated via edges between nodes. In one or more embodiments, the source function definition may be an entry point to the first module.

In one or more embodiments, the points-to analysis utilizes global relations that are independent of the information (e.g., the tuples) generated during the points-to analysis. Some examples of global relations include subclass and superclass relations, which may be utilized during the points-to analysis for statements that cast objects (e.g., statements that change the class of an object). For example, the global relations may include syntactic information extracted by examining the class hierarchy that may be useful in identifying the class of an object referred to by a variable encountered during a points-to analysis. Since the global relations may remain constant during a points-to analysis of a specific function definition, to improve efficiency, it may be useful to compute the global relations only once per points-to analysis.

In Step 204, a set of target function definitions reachable from the source function definition is determined, using the call graph and until a fixedpoint condition is triggered. In one or more embodiments, a target function definition reachable from the source function definition is indicated by an edge in the call graph originating from the node corresponding to the source function definition and terminating at the node corresponding to the target function definition. In one or more embodiments, additional target function definitions are added to the set of target function definitions based on following edges in the call graph, until all (e.g., the transitive closure of) target function definitions reachable from the source function definition have been identified. For example, given an edge in the call graph (T, T'), where T corresponds to a target function definition already in the set of target function definitions, and T' corresponds to a target function definition that is not in the set of target function definitions, then T' is added to the set of target function definitions. In this manner, the set of target function definitions may be monotonically expanded until a fixedpoint condition is triggered where no additional target function definitions reachable from the source function definition are identified. In other words, when the fixedpoint condition is triggered, the set of target function definitions is saturated.

In one or more embodiments, a target function definition is added to the set of target function definitions when the target function definition is in a module other than the first module (e.g., based on the dependency graph). For example, all target function definitions in the first module may have already been analyzed in Step 202 above. That is, the target function definition is added to the set of target function definitions when the target function definition is outside the boundary of the first module (i.e., the module that includes the source function definition). For example, there may already be a completed points-to analysis for the first module, and the task at hand may be to analyze the first module relative to other modules (e.g., relative to other modules including function definitions that may have been modified).

In one or more embodiments, the call graph may be incrementally modified during the execution of Step 204, as each successive function definition F is analyzed to determine which other function definitions are called by F. In one or more embodiments, to improve the performance of Step 204, a cross-module call graph may be incrementally generated that is limited to edges (T, T'), where T corresponds to a function definition in the first module and T' corresponds to a function definition external to the first module.

In Step 206, it is determined that a target summary is stored for a first target function definition of the set of target function definitions. In one or more embodiments, the target summary includes a target set of points-to tuples for the first target function definition. For example, the target summary may have been generated in a previous execution of Step 202 above for the first target function definition. In one or more embodiments, the target summary is obtained from a repository that stores summaries corresponding to various function definitions. In one or more embodiments, the first target function definition is in a second module that is distinct from the first module. For example, the first module may be included in application code, and the second module may be included in a library or framework used by the application code.

In Step 208, the target summary is imported into a source summary for the source function definition. In one or more embodiments, the source summary includes the source set of points-to tuples generated in Step 202 above. In one or more embodiments, importing the target summary into the source summary includes adding (e.g., via a set union operation) the target set of points-to tuples to the source set of points-to tuples. In one or more embodiments, importing the target summary into the source summary improves the efficiency of analyzing the source function definition, since importing the already-computed target summary into the source summary is more efficient that performing a points-to analysis encompassing both the source function definition and the target function definition.

In one or more embodiments, the target set of points-to tuples includes a target tuple including a target variable and a marker indicating that the target allocation site is unknown. In one or more embodiments, importing the target summary into the source summary includes modifying the unknown target allocation site to refer to an allocation site in the first module. For example, the unknown allocation site may represent a point of interaction between the first module and the second module (e.g., where the first module defines an allocation site to be used by the second module). In one or more embodiments, the target allocation site may be determined by performing a points-to analysis on the target variable relative to the source function definition. For example, the points-to analysis may determine that the target allocation site is defined within the source function definition or some other function definition in the first module. For example, the points-to analysis may determine that the target allocation site corresponds to a call site in the source function definition where a parameter is provided to the first target function definition.

Figure 3:
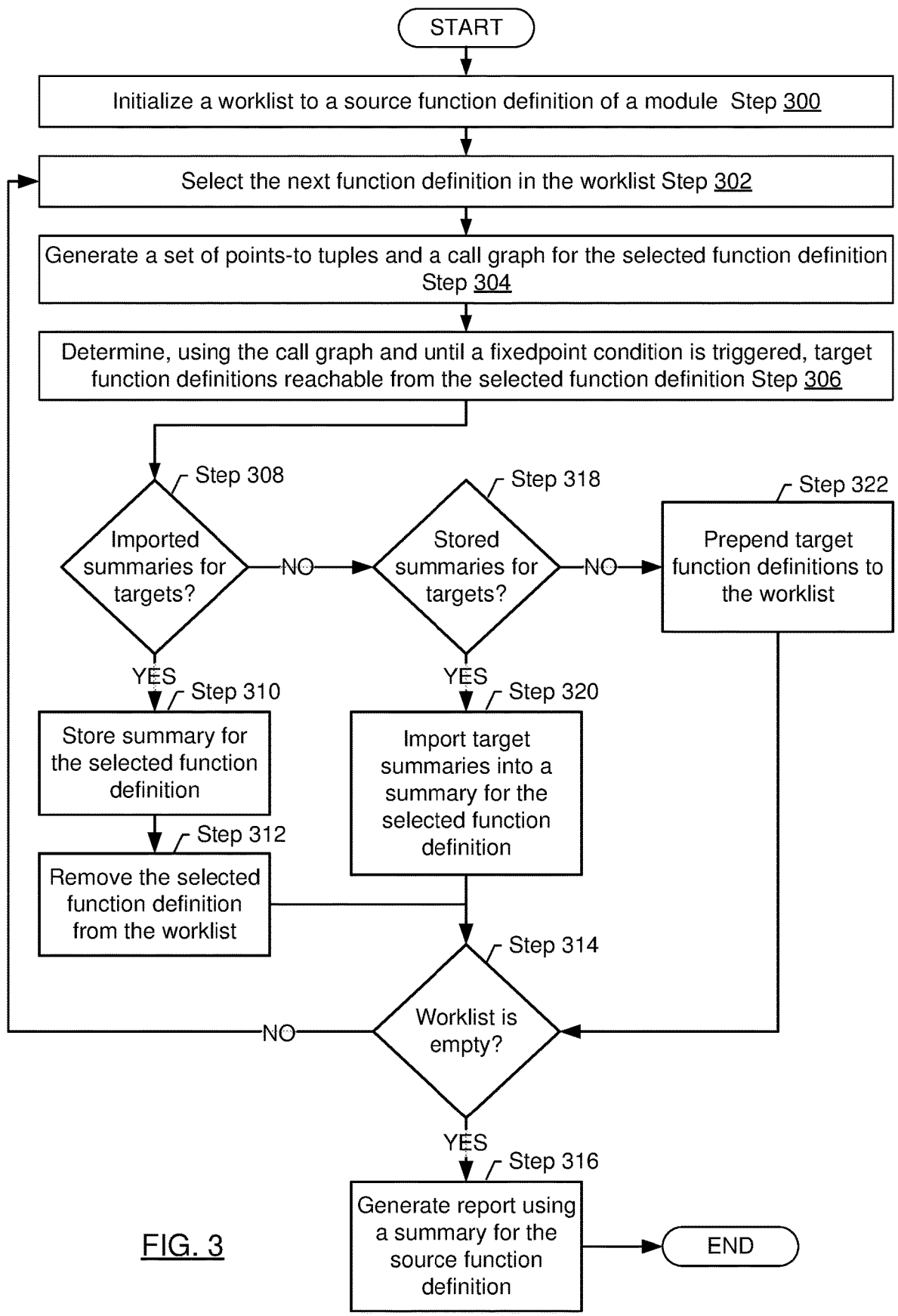

FIG. 3 shows a flowchart in accordance with one or more embodiments of the invention. The flowchart depicts a process for analyzing code. One or more of the steps in FIG. 3 may be performed by the components (e.g., the module analyzer (104)) of the computer system (100), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, a worklist is initialized to a source function definition of a module. In one or more embodiments, function definitions are processed in the order in which the function definitions appear in the worklist. In one or more embodiments, the function definitions in the worklist are arranged such that the highest-priority function definition is the first element in the worklist, and subsequent function definitions in the worklist have successively lower priority.

In Step 302, the next function definition in the worklist is selected.

In Step 304, a set of points-to tuples and a call graph are generated for the selected function definition (see description of Step 202 above).

In Step 306, a set of target function definitions reachable from the selected function definition is determined, using the call graph and until a fixedpoint condition is triggered (see description of Step 204 above).

If, in Step 308, it is determined that a summary for each target function definition reachable from the selected function definition has already been imported into a summary the selected function definition (see descriptions of Step 206 and Step 208 above), then the points-to analysis for the selected function definition is complete, and Step 310 below is performed. Otherwise, if Step 308 determines that a summary for each target function definition reachable from the selected function definition has not yet been imported, then Step 318 below is performed.

In Step 310, the summary for the selected function definition is stored. For example, the summary may be stored in a repository.

In Step 312, the selected function definition is removed from the worklist (e.g., now that the points-to analysis for the selected function definition is complete).

If, in Step 314, it is determined that the worklist is empty, then in Step 316 a report is generated using the (now completed) summary for the source function definition. That is, an empty worklist may indicate that summaries for all target function definitions reachable from the source function definition have been imported into the summary for the source function definition. Otherwise, if Step 314 determines that the worklist is non-empty, then Step 302 above is performed, to process the next function definition in the worklist.

If, in Step 318, it is determined that a summary for each target function definition reachable from the selected function definition has been stored (e.g., in a previous iteration of Step 310 above), then Step 320 below is performed. Otherwise, if Step 318 determines that a summary for each target function definition reachable from the selected function definition has not yet been stored, then in Step 322 the target function definitions reachable from the selected function definition without a stored summary are prepended to the beginning of the worklist, and Step 314 above is performed. That is, subsequent iterations of the loop from Step 302 to Step 314 may generate summaries for the target function definitions prepended to the worklist.

In one or more embodiments, placing the target function definitions at the beginning of the worklist ensures that the target function definitions are processed in a bottom-up fashion, until all summaries are generated for all target function definitions reachable from the selected function definition. That is, a summary for a target function definition T may be generated before generating a summary for a target function definition T' that calls target function definition T.

The precision of the dependency graph may determine how many target function definitions are reachable from the selected function definition, as well as the sizes of the summaries generated for the target function definitions. For example, a coarse dependency graph may contain a small number of large modules, which is likely to result in a small number of target function definitions residing in a module different from the module that includes the selected function definition. And since the modules may be likely to include a large number of function definitions, the number of points-to tuples generated by the points-to analyses in Step 304 above may be large.

In Step 320, each target summary reachable from the selected function definition is imported into the summary for the selected function definition (see description of Step 208 above). In one or more embodiments, importing the target function definitions proceeds in a bottom-up fashion, until the summaries for all target function definitions reachable from the source function definition are imported into the summary for the source function definition. If there are cycles in the dependency graph (e.g., if some modules are not strongly connected components of the dependency graph), then importing the target summaries may deadlock (e.g., if computing one target summary requires importing another target summary, and vice versa).

Figure 4A:
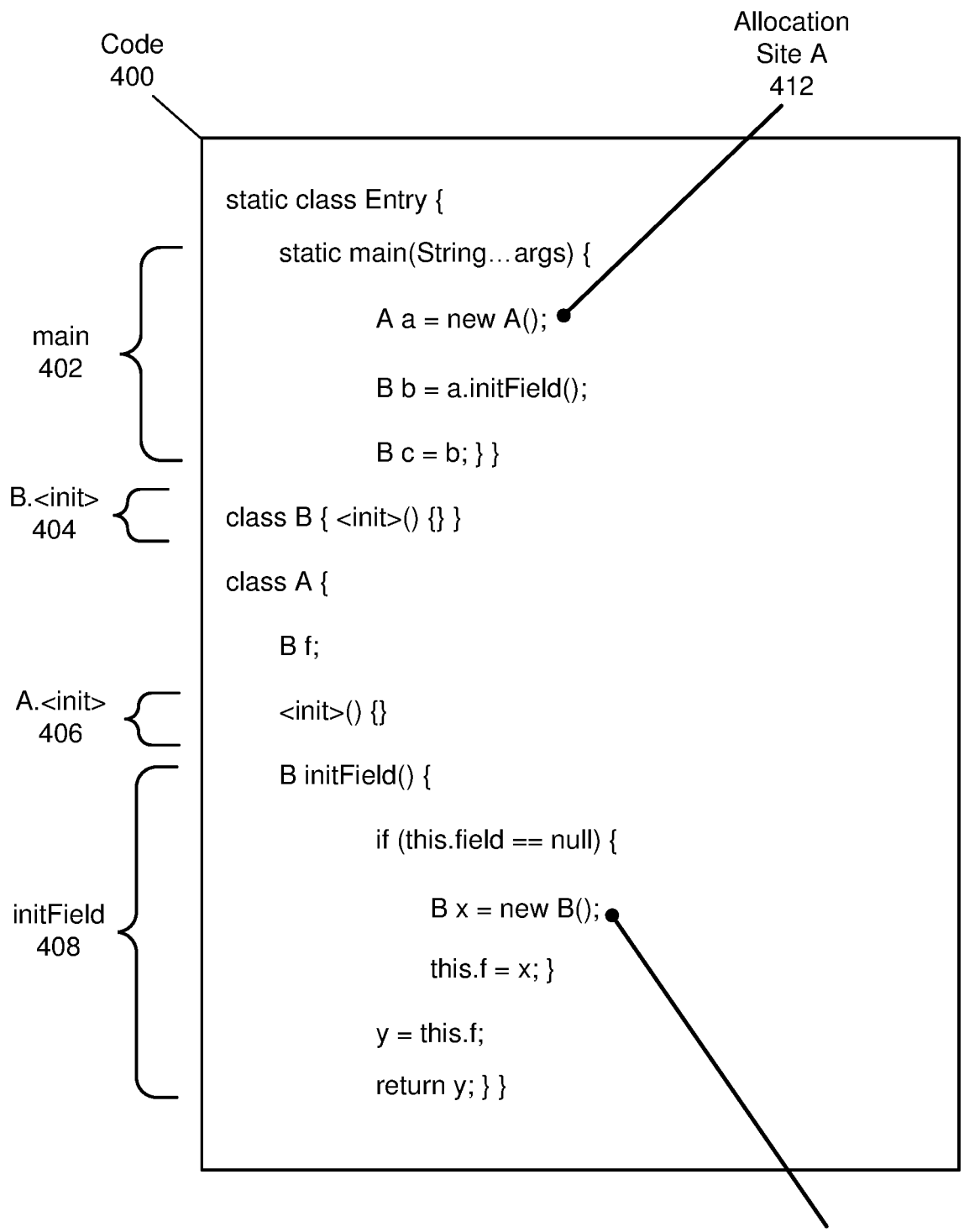
Figure 4B:
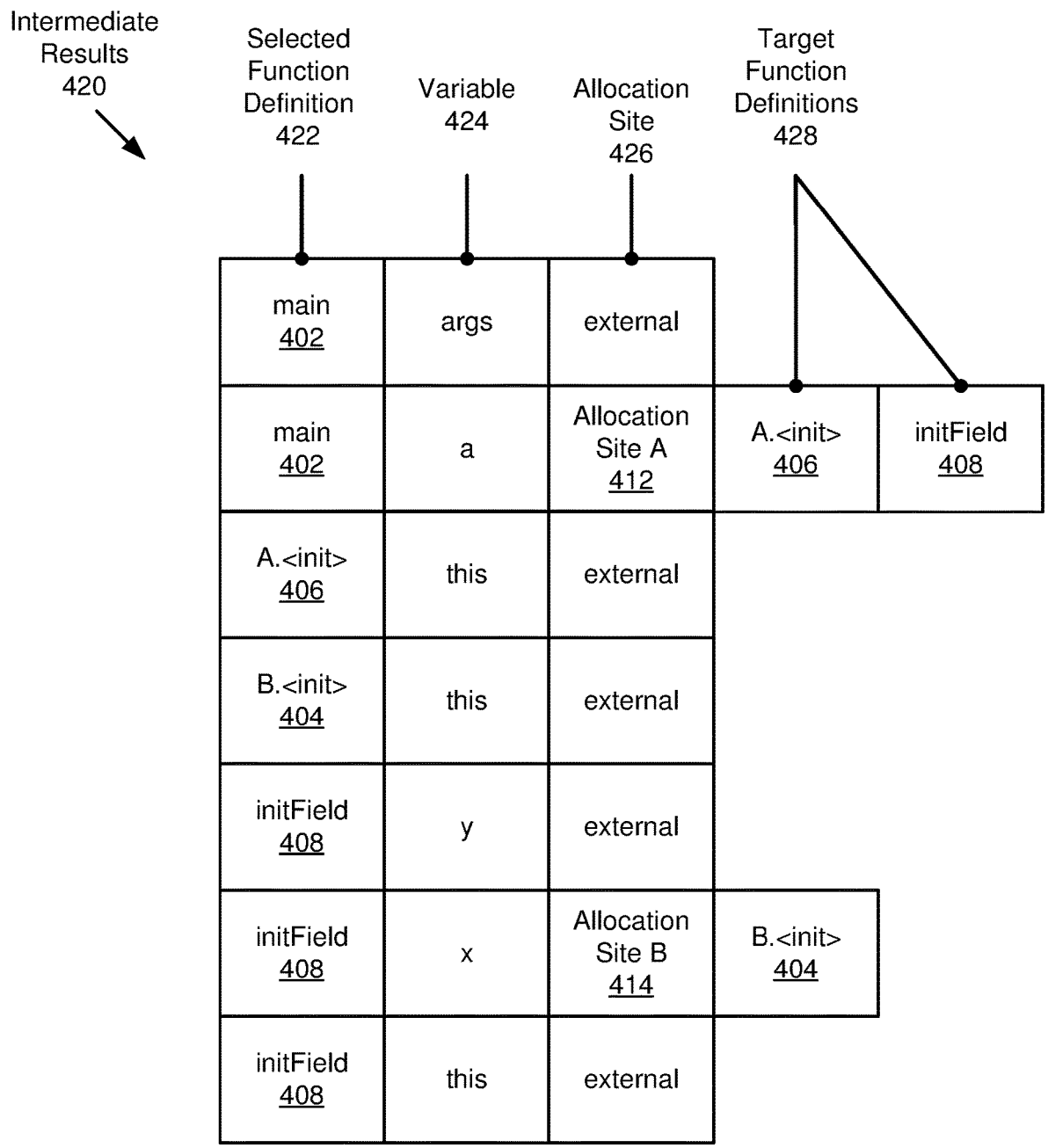

The following example is for explanatory purposes only and not intended to limit the scope of the invention. FIG. 4A, FIG. 4B, and FIG. 4C show an implementation example in accordance with one or more embodiments of the invention.

FIG. 4A illustrates a snippet of code (400) that includes four function definitions: main (402), B.<init> (404), A.<init> (406), and initField (408), each of which is in a different module. The function definition main (402) includes allocation site A (412) that allocates a new object of class A. The function definition initField (408) includes allocation site B (414) that allocates a new object of class B.

FIG. 4B illustrates intermediate results (420) generated by the module analyzer (104) during the analysis of the code (400) of FIG. 4A. Each row in the intermediate results (420) includes information about a selected function definition (422), including a variable (424), an allocation site (426), and optionally, a target function definition (428) reachable from the selected function definition (422). The module analyzer (104) starts the process by analyzing main (402). The args variable has been allocated by the caller of main (402), but since the caller is unknown, the object referenced by args is unknown to the module analyzer (104). Therefore, the module analyzer (104) assigns the allocation site for args to be a marker "external" indicating that the allocation site for args is unknown, as shown in the first row of the intermediate results (420). In contrast, variable a is allocated at allocation site A (412) of FIG. 4A using the constructor function definition A.<init> (406). In addition, the call graph includes an edge from a call site in main (402) to initField (408). The second row of the intermediate results (420) shows that the variable a is allocated at allocation site A (412), and that there are two target function definitions reachable from main (402): A.<init> (406) and initField (408).

Since no summaries exist for either of the reachable target function definitions A.<init> (406) or initField (408), the module analyzer (104) then generates summaries for both A.<init> (406) or initField (408). However, the constructor A.<init> (406) has an empty body, and the only points-to information generated by the module analyzer (104) for A.<init> (406) is that the variable this has an unknown allocation site, as illustrated in the third row of the intermediate results (420).

Next, the module analyzer (104) generates a summary for initField (408). The module analyzer (104) discovers that variable x is allocated at allocation site B (414) and that the target function definition B.<init> (404) is reachable from initField (408). Since no summary has yet been generated for B.<init> (404), the module analyzer (104) then generates the summary for B.<init> (404). Because the B.<init> (404) has an empty body, the summary for B.<init> (404) is empty. However, generating the empty summary for B.<init> (404) has the side effect of identifying B.<init> (404) as a target function definition reachable from initField (408). The points-to analysis reveals that the variable this of B.<init> (404) points to allocation site B (414), which expresses a context-sensitive relationship, and therefore allocation site B (414) is replaced with "external" in the context-insensitive summary for B.<init> (404), as shown in the fourth row of the intermediate results (420).

Once the summary for B.<init> (404) is generated, the module analyzer (104) resumes its analysis of initField (408). A fixedpoint is reached, since the module analyzer (104) does not find any additional target function definitions reachable from initField (408) other than B.<init> (404). The module analyzer (104) then stores the summary for initField (408), which includes the points-to tuples that are fixed during any execution of initField (408). The module analyzer (104) determines that the variable x of initField (408) refers to allocation site B (414). The summary for initField (408) is shown in the fifth, sixth, and seventh rows of FIG. 4B. During the generation of the summary for initField (408), the allocation site for the variable y is external (i.e., unknown) since the local analysis of initField (408) does not know whether the variable f was allocated externally to initField (408), as shown in the fifth row of the intermediate results (420).

The module analyzer (104) then imports the summaries for A.<init> (406) and initField (408) into the summary for main (430), as illustrated in FIG. 4C. The module analyzer (104) determines that the allocation site for variable y of initField (408) is allocation site B (414). The module analyzer (104) then propagates allocation site B (414) to variable b of main (402), now that allocation site B (414) has been assigned to variable y of initField (408). The summary for main (430) includes the summaries for all subsequently started points-to analyses for the target function definitions (404, 406, 408) reachable from main (402). Therefore, all points-to information (excluding the external allocation sites) from the points-to analyses for B.<init> (404), A.<init> (406), and initField (408) are merged and used in the summary for main (430).

Figure 5:
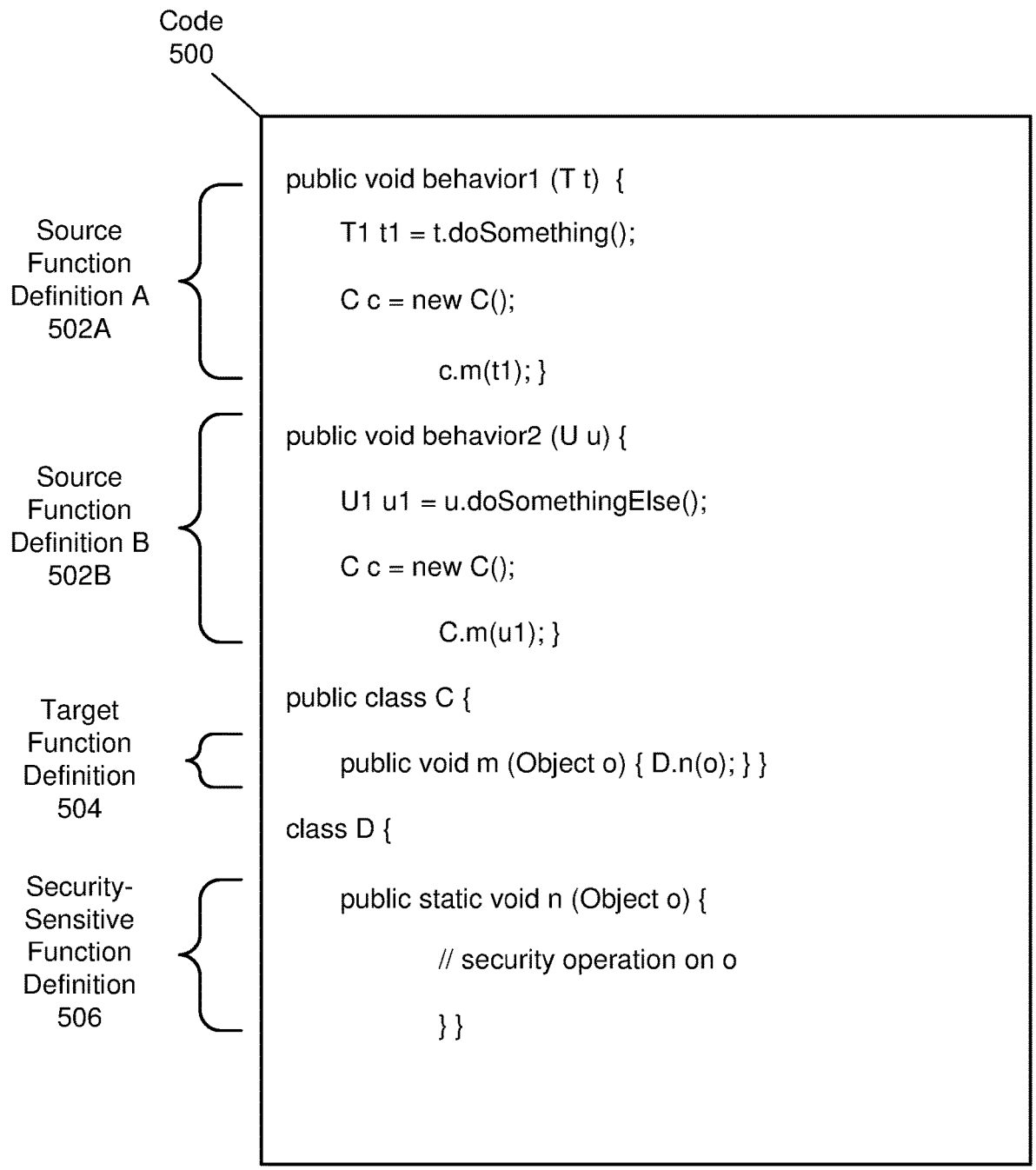

The following example is for explanatory purposes only and not intended to limit the scope of the invention. FIG. 5 shows an implementation example in accordance with one or more embodiments of the invention.

FIG. 5 illustrates code (500) for a simple security use case. In FIG. 5, source function definitions (502A, 502B) call a target function definition m (504), which is part of a security-sensitive module (e.g., library) that is distinct from the module that includes the source function definitions (502A, 502B). The points-to analysis of target function definition m (504) is nontrivial because target function definition m (504) calls other function definitions in the security-sensitive module, as illustrated in the call from target function definition m (504) to security-sensitive function definition n (506). Because target function definition m (504) calls security-sensitive function definition n (506), target function definition m (504) is indirectly security-sensitive, and the integrity of target function definition m's (504) behavior depends on the object o that target function definition m (504) receives as an argument from the source function definitions (502A, 502B).

When the module analyzer (104) analyzes source function definition A (502A), classes T and T1 are analyzed due to the call to t.doSomething( ), and target function definition m (504) is also analyzed due to the call to c.m( ). Similarly, when the module analyzer (104) analyzes source function definition B (502B), classes U and U1 are analyzed due to the call to t.doSomething( ), and target function definition m (504) is again analyzed due to the call to c.m( ). Thus, when the module analyzer (104) analyzes source function definition B (502B), the analysis of c.m from source function definition A (502A) may be reused.

The summarization of target function definition m (504) indicates that the allocation site of input argument o is external (i.e., unknown). Therefore, the external allocation site is replaced with an actual allocation site when the summary of target function definition m (504) is imported into the summaries for the source function definitions (502A, 502B). The security analysis (e.g., a client analysis performed using the points-to analysis) applies rules to check that the desired security properties are satisfied. In this example, a security rule indicates that an invocation of security-sensitive function definition n (506) is secure if the object passed to security-sensitive function definition n (506) has been created by a secure factory method. In this example, it turns out that source function definition A (502A) invokes a secure factory method to create an object of type T1, while source function definition B (502B) does not invoke a secure factory method to create an object of type U1. Therefore, applying the security rule, combined with importing the summary for target function definition m (504), results in the detection of a security violation in source function definition B (502B). In other words, the summaries for target function definition m (504) and security-sensitive function definition n (506) provide the information used in the security analysis of the argument o of target function definition m (504) that flows to security-sensitive function definition n (506). The security violation is then used to identify a portion of the code (500) to be modified in order to address and/or eliminate the security violation. For example, the portion of the code (500) may be identified using a call graph and/or various utilities for tracing and/or debugging the execution of the code (500).

Figure 6A:
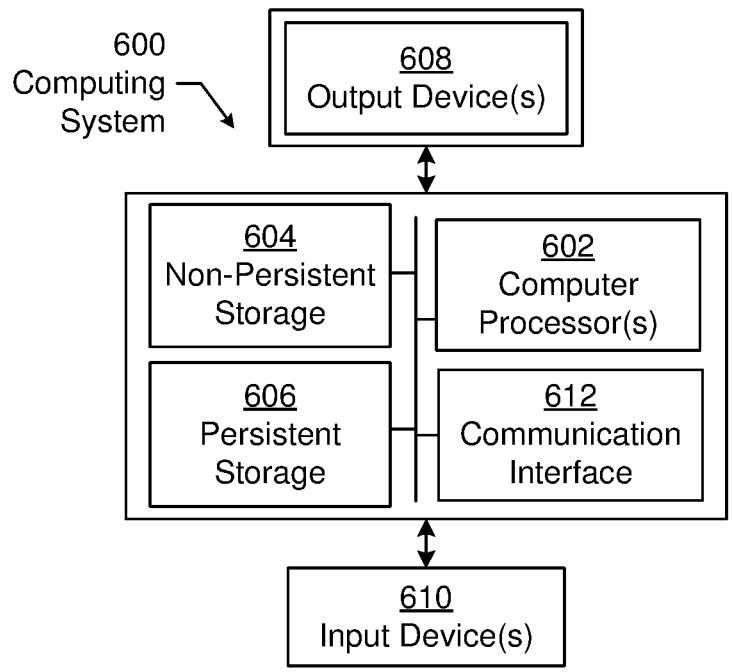
FIG. 6A and FIG. 6B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 6B:
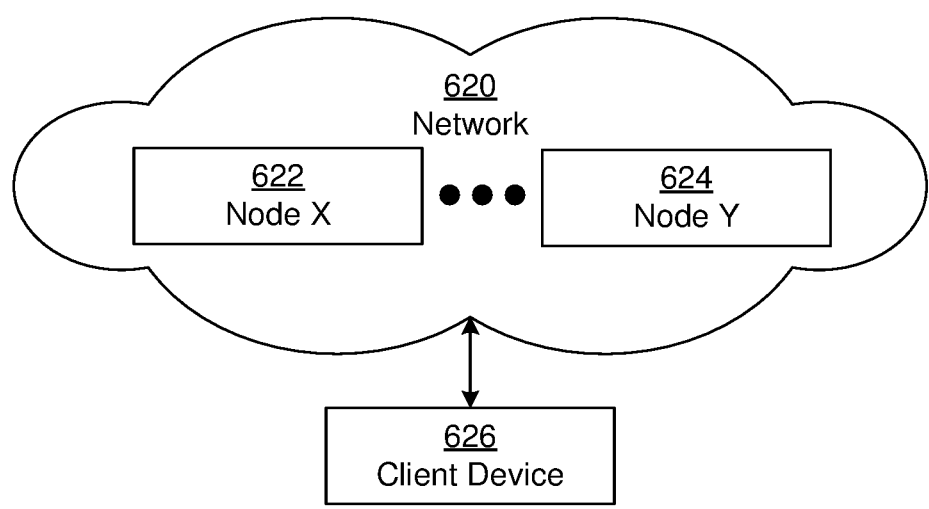

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments disclosed herein.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 6A and the nodes and/or client device in FIG. 6B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing code, comprising:
   determining, using a dependency graph for the code, a set of modules each comprising a set of function definitions;

generating a source set of points-to tuples and a call graph for a source function definition in a first module of the set of modules, the source set of points-to tuples comprising a source tuple comprising a source variable and a source allocation site, wherein the source allocation site is a reference to a location in a memory of a computer system allocated when the source function definition is executed;

determining, using the call graph and until a fixedpoint condition is triggered, a set of target function definitions reachable from the source function definition;

determining that a target summary is stored for a first target function definition of the set of target function definitions; and importing the target summary into a source summary for the source function definition, the source summary comprising the source set of points-to tuples.

2. The method of claim 1, further comprising:
generating a target set of points-to tuples for the first target function definition; and
storing, for the first target function definition, the target summary comprising the target set of points-to tuples.

3. The method of claim 2,
wherein the target set of points-to tuples comprises a target tuple comprising a target variable and a target allocation site,
wherein the target allocation site is a marker indicating that the target allocation site is unknown,
wherein the first target function definition is in a second module of the set of modules, and
wherein importing the target summary comprises modifying the target tuple by replacing the marker with the source allocation site.

4. The method of claim 3,
wherein the first target function definition calls a security-sensitive function definition in the second module, and
wherein the first target function passes the target variable to the security-sensitive function definition,
the method further comprising:
applying a security rule to the target variable; and
detecting a security violation in response to applying the security rule and importing the target summary into the source summary, wherein the security violation is used to identify a portion of the code to be modified.

5. The method of claim 1, wherein triggering the fixedpoint condition comprises determining that no additional target function definitions are reachable from the source function definition.

6. The method of claim 1, further comprising:
generating a report about the first module using the source summary.

7. The method of claim 1, wherein each module of the set of modules corresponds to a strongly connected component of the dependency graph.

8. A system for analyzing code, comprising:
a processor;
a dependency graph for the code comprising a set of modules each comprising a set of function definitions;
a memory comprising instructions that, when executed by the processor, cause the processor to:
determine, using the dependency graph, the set of modules;
generate a source set of points-to tuples and a call graph for a source function definition in a first module of the set of modules, the source set of points-to tuples comprising a source tuple comprising a source variable and a source allocation site, wherein the source allocation site is a reference to a location in a memory of a computer system allocated when the source function definition is executed;
determine, using the call graph and until a fixedpoint condition is triggered, a set of target function definitions reachable from the source function definition;
determine that a target summary is stored for a first target function definition of the set of target function definitions; and
import the target summary into a source summary for the source function definition, the source summary comprising the source set of points-to tuples; and
a repository, configured to store at least the code and the dependency graph.

9. The system of claim 8, wherein the memory further comprises instructions that, when executed by the processor, cause the processor to:
generate a target set of points-to tuples for the first target function definition; and
store, for the first target function definition, the target summary comprising the target set of points-to tuples.

10. The system of claim 9,
wherein the target set of points-to tuples comprises a target tuple comprising a target variable and a target allocation site,
wherein the target allocation site is a marker indicating that the target allocation site is unknown,
wherein the first target function definition is in a second module of the set of modules, and
wherein importing the target summary comprises modifying the target tuple by replacing the marker with the source allocation site.

11. The system of claim 10,
wherein the first target function definition calls a security-sensitive function definition in the second module,
wherein the first target function passes the target variable to the security-sensitive function definition, and
wherein the memory further comprises instructions that, when executed by the processor, cause the processor to:
apply a security rule to the target variable; and
detect a security violation in response to applying the security rule and importing the target summary into the source summary, wherein the security violation is used to identify a portion of the code to be modified.

12. The system of claim 8, wherein triggering the fixedpoint condition comprises determining that no additional target function definitions are reachable from the source function definition.

13. The system of claim 8, wherein the memory further comprises instructions that, when executed by the processor, cause the processor to:
generate a report about the first module using the source summary.

14. The system of claim 8, wherein each module of the set of modules corresponds to a strongly connected component of the dependency graph.

15. A non-transitory computer readable medium comprising instructions that, when executed by a processor, perform a method for analyzing code, the method comprising:
determining, using a dependency graph for the code, a set of modules each comprising a set of function definitions;
generating a source set of points-to tuples and a call graph for a source function definition in a first module of the set of modules, the source set of points-to tuples comprising a source tuple comprising a source variable and a source allocation site, wherein the source allocation site is a reference to a location in a memory of a computer system allocated when the source function definition is executed;

determining, using the call graph and until a fixedpoint condition is triggered, a set of target function definitions reachable from the source function definition;

determining that a target summary is stored for a first target function definition of the set of target function definitions; and importing the target summary into a source summary for the source function definition, the source summary comprising the source set of points-to tuples.

16. The non-transitory computer readable medium of claim 15, wherein the method further comprises:

generating a target set of points-to tuples for the first target function definition; and storing, for the first target function definition, the target summary comprising the target set of points-to tuples.

17. The non-transitory computer readable medium of claim 16, wherein the target set of points-to tuples comprises a target tuple comprising a target variable and a target allocation site, wherein the target allocation site is a marker indicating that the target allocation site is unknown, wherein the first target function definition is in a second module of the set of modules, and wherein importing the target summary comprises modifying the target tuple by replacing the marker with the source allocation site.

18. The non-transitory computer readable medium of claim 17, wherein the first target function definition calls a security-sensitive function definition in the second module, and wherein the first target function passes the target variable to the security-sensitive function definition, the method further comprising:

applying a security rule to the target variable; and detecting a security violation in response to applying the security rule and importing the target summary into the source summary, wherein the security violation is used to identify a portion of the code to be modified.

19. The non-transitory computer readable medium of claim 15, wherein triggering the fixedpoint condition comprises determining that no additional target function definitions are reachable from the source function definition.

20. The non-transitory computer readable medium of claim 15, wherein the method further comprises:

generating a report about the first module using the source summary.

* * * * *